(12) United States Patent
Hikichi

(10) Patent No.: US 9,049,321 B2
(45) Date of Patent: Jun. 2, 2015

(54) IMAGE FORMING APPARATUS IN WHICH TIME TAKEN TO RETURN FROM SLEEP STATE IS REDUCED, METHOD OF CONTROLLING IMAGE FORMING APPARATUS, AND STORAGE MEDIUM

(71) Applicant: CANON KABUSHIKI KAISHA, Tokyo (JP)

(72) Inventor: Atsushi Hikichi, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 13/912,322

(22) Filed: Jun. 7, 2013

(65) Prior Publication Data
US 2013/0329239 A1  Dec. 12, 2013

(30) Foreign Application Priority Data
Jun. 11, 2012  (JP) .................. 2012-131917

(51) Int. Cl.
*H04N 1/40*  (2006.01)
*H04N 1/00*  (2006.01)

(52) U.S. Cl.
CPC ....... *H04N 1/00384* (2013.01); *H04N 1/00411* (2013.01); *H04N 1/00474* (2013.01); *H04N 1/00896* (2013.01); *H04N 2201/0094* (2013.01)

(58) Field of Classification Search
CPC .......... H04N 2101/00; H04N 5/23293; H04N 5/772; H04N 1/2112; H04N 1/2125; H04N 1/2137; H04N 1/2158; H04N 1/32101; H04N 5/232; G06F 1/1626; G06F 1/1616; G09G 2330/022; G09G 2330/021; G09G 5/363
USPC ........... 358/1.9, 2.1, 468, 448, 400, 500, 406, 358/504; 348/333.11; 455/566
See application file for complete search history.

(56) References Cited

U.S. PATENT DOCUMENTS

| 7,359,740 B2 * | 4/2008 | Okuzako et al. ........... 455/575.3 |
| 2003/0214527 A1 * | 11/2003 | Paul ............................... 345/719 |
| 2008/0143695 A1 * | 6/2008 | Juenemann et al. .......... 345/204 |

FOREIGN PATENT DOCUMENTS

| JP | 2000-194324 A | 7/2000 |
| JP | 2001-111797 A | 4/2001 |

* cited by examiner

*Primary Examiner* — Thomas D Lee
*Assistant Examiner* — Stephen M Brinich
(74) *Attorney, Agent, or Firm* — Rossi, Kimms & McDowell LLP

(57) ABSTRACT

An image forming apparatus in which time taken before a screen is displayed after return from sleep is reduced. Image data to be displayed on an LCD touch panel after the image forming apparatus returns from a power saving state to a normal state is generated when the image forming apparatus shifts from the normal state to the power saving state. The generated image data is stored in a memory. When the image forming apparatus returns from the power saving state to the normal state, the LCD touch panel is caused to display an image represented by the image data stored in the memory.

7 Claims, 10 Drawing Sheets

IMAGE FORMING APPARATUS IN WHICH TIME TAKEN TO RETURN FROM SLEEP STATE IS REDUCED, METHOD OF CONTROLLING IMAGE FORMING APPARATUS, AND STORAGE MEDIUM

BACKGROUND OF THE INVENTION

1. Field of the Invention

The present invention relates to an image forming apparatus in which time taken to return from a sleep state is reduced, a method of controlling the image forming apparatus, and a storage medium.

2. Description of the Related Art

In recent years, an increasing number of image forming apparatuses have come to be provided with a sleep mode in which when the apparatus is not in use by a user, the image forming apparatus is only partially energized thereby preventing electric power from being supplied to components unnecessary for the multifunction peripheral to return from the sleep mode.

It is desirable that return from the sleep mode (hereinafter referred to as "return from sleep") takes a short time period. However, with improvement in the performance of each of devices forming an image forming apparatus and the function of an OS, the number of devices that require return processing has increased and the number of stages of return processing executed by an OS has also increased. Therefore, simple execution of the return from sleep tends to increase time taken to complete the same.

This can cause degradation of response of the image forming apparatus, resulting in degraded user-friendliness of the same.

In the return from sleep, it takes time in units of seconds before the backlight of an LCD touch panel provided in an image forming apparatus is turned on after starting a process for the return from sleep. For example, an image forming apparatus performs the process as follows: After initializing hardware devices and an OS, screen data to be rendered on an LCD touch panel is generated, and a screen to be displayed after the return from sleep is rendered in an image buffer memory, whereafter the LCD touch panel is displayed. Therefore, it takes time in units of seconds before the image forming apparatus completes the process for the return from sleep.

In connection with the above-described technique, there has been disclosed a technique in which when the backlight is turned off, the display density value of the LCD touch panel is automatically adjusted to a larger value than a value set before the turn-off of the backlight (see e.g. Japanese Patent Laid-Open Publication No. 2000-194324).

Further, there has been disclosed a method of increasing the speed of the return from sleep in which initialization of an image memory is not executed during return from sleep, and after the entire system is initialized, the initialization of the image memory is started as background processing (see e.g. Japanese Patent Laid-Open Publication No. 2001-111797).

SUMMARY OF THE INVENTION

The present invention provides an image forming apparatus in which time taken before a screen is displayed is reduced when return from sleep is executed, a method of controlling the image forming apparatus, and a storage medium.

In a first aspect of the present invention, there is provided an image forming apparatus that includes a display section for displaying an image represented by image data stored in a storage section, and is capable of operating in a power saving state and a normal state in which a larger amount of electric power is consumed than in the power saving state, comprising a generation unit configured to, when the image forming apparatus shifts from the normal state to the power saving state, generate image data to be displayed on the display section after the image forming apparatus returns from the power saving state to the normal state, a storage unit configured to store the image data generated by the generation unit, in the storage section, and a control unit configured to, after the image forming apparatus returns from the power saving state to the normal state, cause the display section to display an image represented by the image data stored in the storage section by the storage unit.

In a second aspect of the present invention, there is provided a method of controlling an image forming apparatus that includes a display section for displaying an image represented by image data stored in a storage section, and is capable of operating in a power saving state and a normal state in which a larger amount of electric power is consumed than in the power saving state, comprising generating, when the image forming apparatus shifts from the normal state to the power saving state, image data to be displayed on the display section after the image forming apparatus returns from the power saving state to the normal state, storing the generated image data in the storage section, and causing, after the image forming apparatus returns from the power saving state to the normal state, the display section to display an image represented by the image data stored in the storage section.

In a third aspect of the present invention, there is provided a non-transitory computer-readable storage device storing a computer-executable program for causing a computer to execute a method of controlling an image forming apparatus that includes a display section for displaying an image represented by image data stored in a storage section, and is capable of operating in a power saving state and a normal state in which a larger amount of electric power is consumed than in the power saving state, wherein the method comprises generating, when the image forming apparatus shifts from the normal state to the power saving state, image data to be displayed on the display section after the image forming apparatus returns from the power saving state to the normal state, storing the generated image data in the storage section, and causing, after the image forming apparatus returns from the power saving state to the normal state, the display section to display an image represented by the image data stored in the storage section.

According to the present invention, it is possible to reduce time taken before a screen is displayed when return from sleep is executed.

Further features of the present invention will become apparent from the following description of exemplary embodiments with reference to the attached drawings.

DESCRIPTION OF THE EMBODIMENTS

The present invention will now be described in detail below with reference to the accompanying drawings showing an embodiment thereof.

Figure 1:
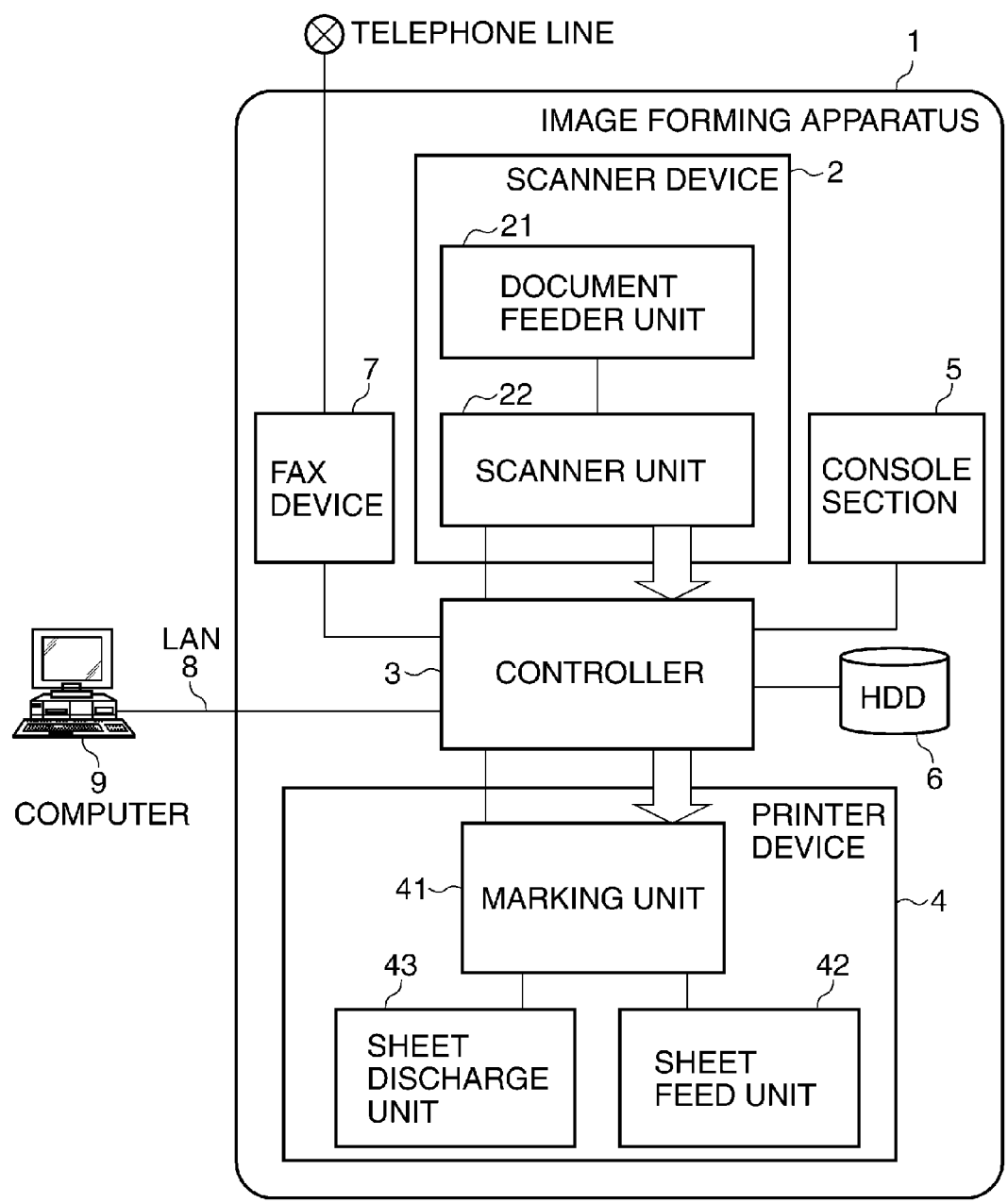
FIG. 1 is a schematic diagram of the configuration of an image forming apparatus according to an embodiment of the present invention.

FIG. 1 is a schematic diagram of the configuration of an image forming apparatus 1 according to the embodiment of the present invention.

As shown in FIG. 1, the image forming apparatus 1 comprises a controller 3, a scanner device 2, a printer device 4, a console section 5, a FAX device 7, and a hard disk 6.

The controller 3 controls the overall operation of the image forming apparatus 1. The general configuration of the controller 3 will be described hereinafter.

The scanner device 2 comprises a document feeder unit 21 capable of automatically feeding originals one by one from a bundle of originals and a scanner unit 22 that optically scans an image from an original and convert the scanned image to image data. With these units, the scanner device 2 optically reads an image from an original and converts the read image to image data. The image data obtained by the conversion is sent to the controller 3.

The printer device 4 comprises a sheet feed unit 42 capable of sequentially feeding recording sheets one by one from a bundle of sheets, a marking unit 41 for printing an image on a fed sheet, and a sheet discharge unit 43 for discharging printed sheets. With these units, the printer device 4 prints an image on a sheet.

The console section 5 displays information for a user, and includes keys, described hereinafter, which are used by the user to operate the image forming apparatus 1. The appearance of the console section 5 will be described hereinafter.

The FAX device 7 transmits and receives images using a telephone line. The hard disk 6 stores image data, programs, and so forth.

The image forming apparatus 1 is capable of exchanging image data with a computer 9 via a LAN 8, so that the user can issue jobs and other instructions from the computer 9 to the image forming apparatus 1.

With the above-described configuration, the image forming apparatus 1 is provided with a copying function for storing image data obtained by the scanner device 2 in the hard disk 6 and at the same time performing printing using the printer device 4.

Further, the image forming apparatus 1 is provided with an image transmission function for transmitting image data obtained by the scanner device 2 to the computer 9 via the LAN 8. Furthermore, the image forming apparatus 1 is provided with an image storage function for storing image data obtained by the scanner device 2 in the hard disk 6 so as to perform image transmission or image printing as required.

In addition, the image forming apparatus 1 is provided with an image printing function for rasterizing image data, written e.g. in the page description language, which has been received from the computer 9, and printing the rasterized image data using the printer device 4.

Further, the image forming apparatus 1 is capable of operating in a power saving state as well as in a normal state in which more electric power is consumed than in the power saving state.

Figure 2:
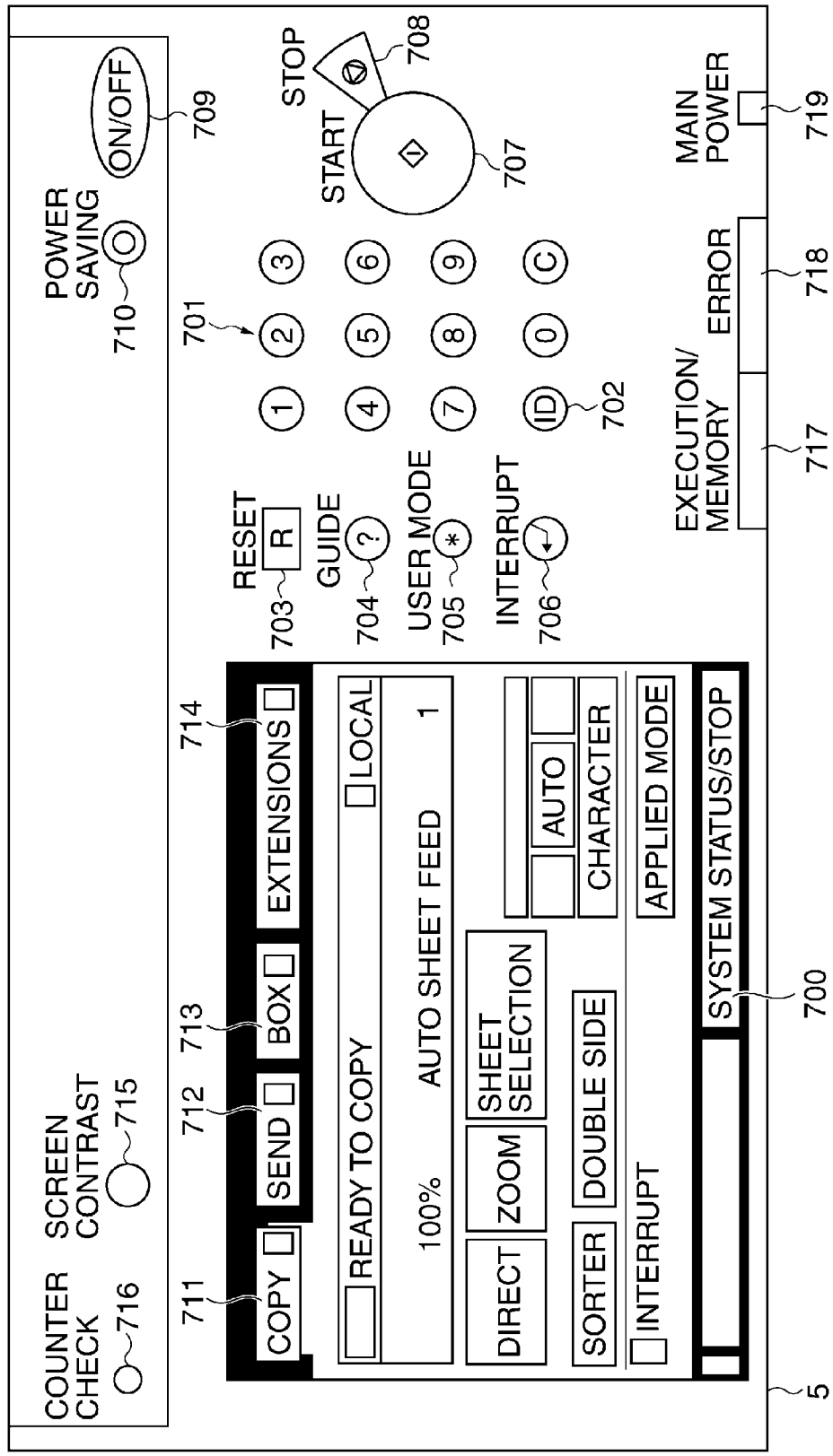
FIG. 2 is a view of the appearance of a console section appearing in FIG. 1.

FIG. 2 is a view of the appearance of the console section 5 appearing in FIG. 1.

Referring to FIG. 2, an LCD touch panel 700 (display section) displays information for a user of the image forming apparatus 1. A ten key pad 701 comprises keys used by the user to input respective numerical values 0 to 9. An ID key 702 is used to input a department number of a company and a secret number when the image forming apparatus 1 is under department management.

A reset key 703 is used to reset an operation mode or the like. A guide key 704 is used to display a screen for explaining each operation mode on the LCD touch panel 700. A user mode key 705 is used to display a user mode screen on the LCD touch panel 700. An interrupt key 706 is used to execute an interrupt copy operation.

A start key 707 is used to start a copy operation. A stop key 708 is used to stop a copy job under execution.

A soft power switch 709 is used to turn off the backlight of the LCD touch panel 700 and shift the image forming apparatus 1 to a sleep state which is a power saving state. In the sleep state, it is possible to achieve quicker startup than in the normal state while suppressing power consumption.

A power saving key 710 is used to shift the image forming apparatus 1 to the sleep state which is the power saving state. When the power saving key 710 is pressed in the sleep state, the image forming apparatus 1 returns from the sleep state to the normal state. In the following, this return from the sleep state to the normal state will often be simply referred to as "return from sleep".

Note that the image forming apparatus 1 shifts to the sleep state not only when the soft power switch 709 or the power saving key 710 is operated, but also when a predetermined time period has elapsed without any user operation.

Function keys 711, 712, 713, and 714 are used to display standard screens for respective functions of copying, transmission, box, and extension. FIG. 2 shows a state where a standard screen for copying is displayed, and when one of the function keys 712, 713, and 714 is pressed in this state, an associated one of the standard screens is displayed. Note that the term "box" refers to a function of storing an image in the hard disk 6.

A screen contrast key 715 is used to adjust the contrast of the LCD touch panel 700. A counter check key 716 is used to display a count screen for displaying the totalized number of copied sheets on the LCD touch panel 700.

An LED 717 illuminates during execution of a job to indicate that image data is being accumulated in an image memory. An error LED 718 illuminates to indicate that the image forming apparatus 1 is in an error state, such as a paper jam state or a door open state. A power LED 719 illuminates to indicate that the main switch of the image forming apparatus 1 is on.

Now, a description will be given of a method of displaying a screen on the LCD touch panel 700. A CPU 201 causes a memory 203 (storage section), described hereinafter, to store image data (e.g. bitmap data) representing a screen in an image area thereof, whereby the screen is displayed on the LCD touch panel 700. Thus, the image forming apparatus 1 is provided with the LCD touch panel 700 that displays an image represented by image data stored in the memory 203.

Note that a dedicated memory area other than the memory 203 may be provided to store image data therein. Alternatively, a multi-stage (multi-page) display buffer area may be provided. The display buffer area is also referred to as "the frame buffer".

Figure 3:
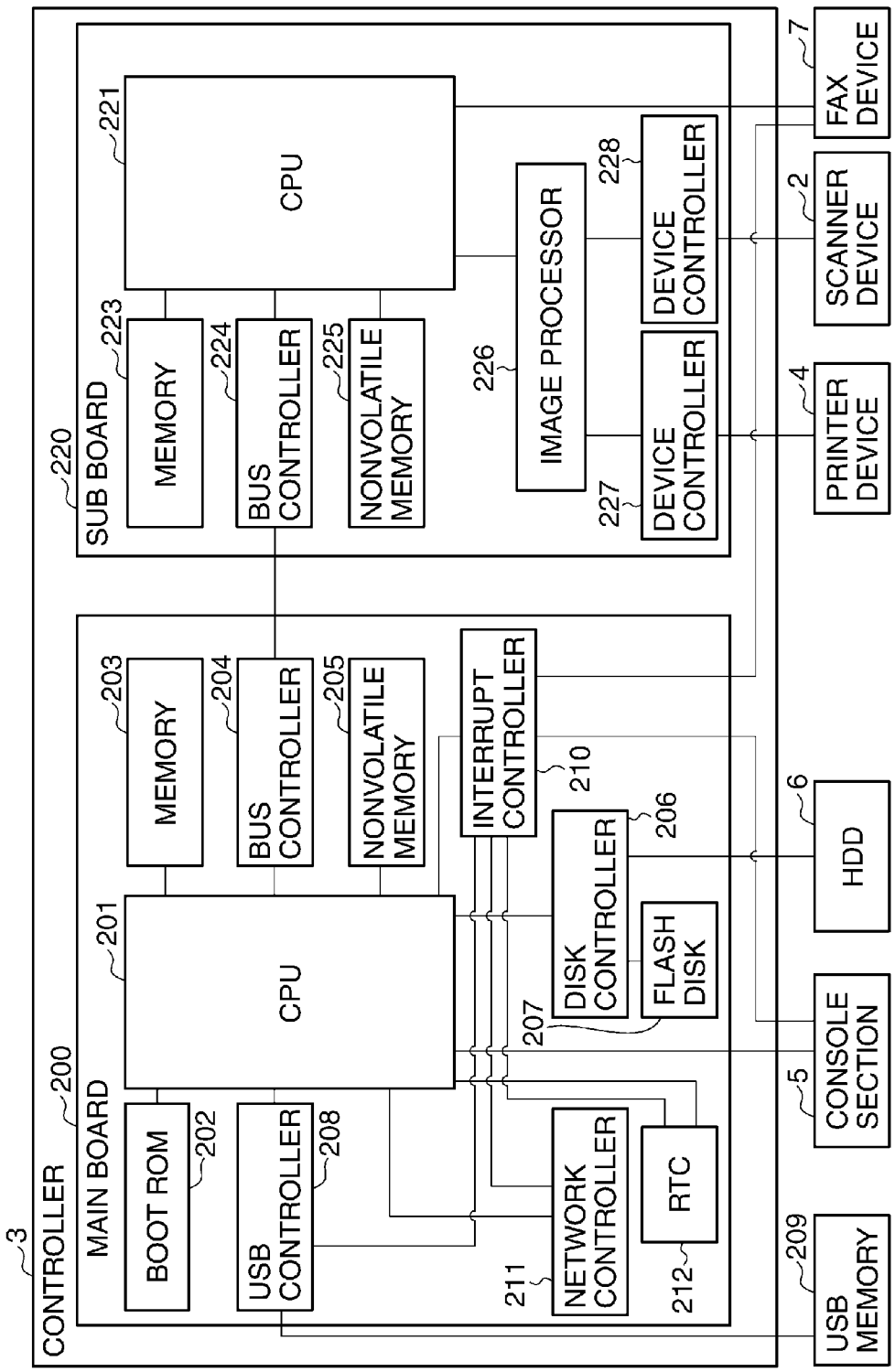
FIG. 3 is a schematic diagram of the configuration of a controller appearing in FIG. 1.

FIG. 3 is a schematic diagram of the configuration of the controller 3 appearing in FIG. 1.

As shown in FIG. 3, the controller 3 comprises a main board 200 and a sub board 220.

The main board 200 is a general-purpose CPU system. The CPU 201 controls the overall operation of the main board 200. The CPU 201 is connected to an interrupt controller 210. Further, the CPU 201 is connected to a network controller 211, a real-time clock (RTC) 212, the FAX device 7, the console section 5, and a USB controller 208.

A boot ROM 202 stores a boot program. The memory 203 is used as a work memory by the CPU 201.

A bus controller 204 has a bridge function to an external bus. A nonvolatile memory 205 holds information stored therein even after supply of electric power is cut off. A disk controller 206 controls a flash disk 207 and the hard disk 6.

The flash disk 207 is a relatively small-capacity storage device implemented by a semiconductor device, such as an SSD. The USB controller 208 controls a USB memory 209.

The main board 200 is connected to USB memory 209, the console section 5, and the hard disk 6, which are disposed outside the main board 200.

The sub board 220 comprises a relatively small general-purpose CPU system and image processing hardware. A CPU 221 controls the overall operation of the sub board 220. A memory 223 is used as a work memory by the CPU 221.

A bus controller 224 has a bridge function to an external bus. A nonvolatile memory 225 holds information stored therein even after supply of electric power is cut off.

An image processor 226 performs real-time digital image processing. Device controllers 227 and 228 control the printer device 4 and the scanner device 2, respectively. The printer device 4 and the scanner device 2 transmit image data via the respective device controllers 227 and 228. The FAX device 7 is directly controlled by the CPU 221.

Note that each of the CPU 201 and the CPU 221 includes many pieces of CPU peripheral hardware, such as a chip set, a bus bridge, a clock generator, and, but since detailed description thereof is not necessary, the CPU 201 and the CPU 221 are shown in FIG. 3 in a simplified manner.

The operation of the controller 3 will be described by taking the copy function as an example. When a user instructs copying via the console section 5, the CPU 201 sends an image reading command to the scanner device 2 via the CPU 221.

The scanner device 2 optically scans a sheet original, converts an image read from the sheet original to image data, and outputs the image data to the image processor 226 via the device controller 228. The image processor 226 DMA-transfers the image data to the memory 223 via the CPU 221 to thereby temporarily store the image data in the memory 223.

When it is confirmed that the amount of image data stored in the memory 223 has exceeded a predetermined amount, the CPU 201 issues an image output instruction to the printer device 4 via the CPU 221.

The CPU 221 notifies the image processor 226 of the position of the image data in the memory 223. The image data stored in the memory 223 is transmitted to the printer device 4 via the image processor 226 and the device controller 227 according to a synchronization signal from the printer device 4, and then an image represented by the image data is printed on a recording sheet by the printer device 4.

In the case of printing a plurality of copies, the CPU 201 can store image data from the memory 223 in the hard disk 6 to send the image data for second and following copies to the printer device 4 without acquiring the image data from the scanner device 2.

Figure 4:
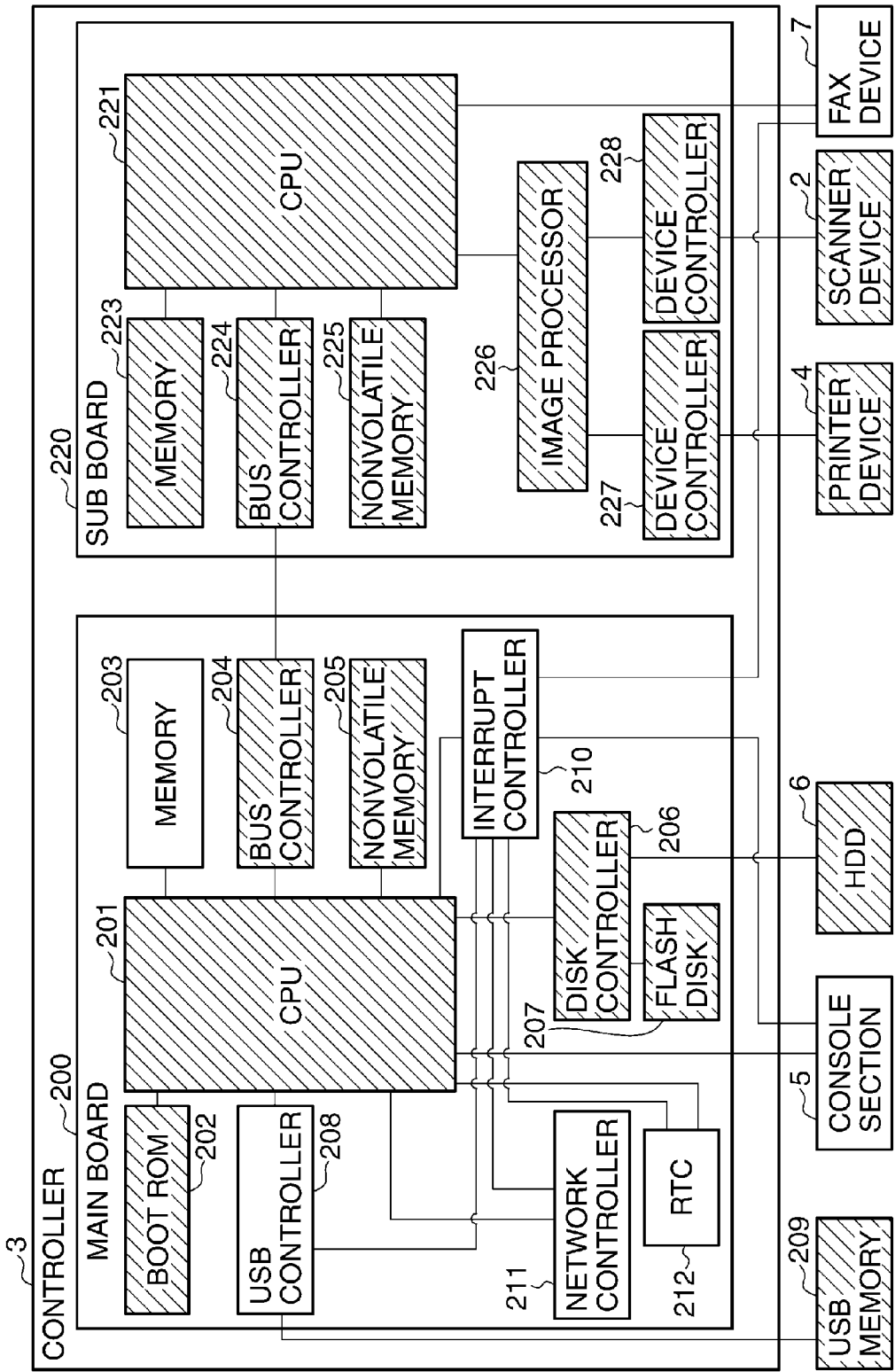
FIG. 4 is a diagram showing blocks of the controller in FIG. 3 to be supplied with electric power in a sleep state.

FIG. 4 is a diagram showing blocks of the controller 3 in FIG. 3 to be supplied with electric power when the image forming apparatus 1 is in the sleep state.

As shown in FIG. 4, when the image forming apparatus 1 is in the sleep state, electric power is supplied to the memory 203, the interrupt controller 210, the network controller 211, the RTC 212, the USB controller 208, the soft power switch 709 on the console section 5, and the FAX device 7, i.e. the blocks other than hatched blocks.

Note that the network controller 211, the RTC 212, the USB controller 208, the console section 5, and the FAX device 7 send an interrupt for return from sleep to the interrupt controller 210.

Specifically, when the image forming apparatus 1 is in the sleep state, the interrupt controller 210 receives one or more interrupts, such as a network reception interrupt, a RTC interrupt (timer or alarm), a FAX interrupt (reception or off-hook), an interrupt from the soft power switch 709, and a USB interrupt (insertion/removal or communication).

Upon receipt of an interrupt, the interrupt controller 210 notifies the CPU 201 that the interrupt has been received. The CPU 201 having received the notification executes processing for returning the state of the supply of electric power and that of the software to the normal state. As an operation generating an interrupt here, it is possible to mention depression of the soft power switch 709, packet reception of the network controller 211, timer or alarm notification of the RTC 212, reception or off-hook of the FAX device 7, or insertion/removal or data reception of the USB controller 208. Note that causes of return from sleep differ from system to system, and therefore the supply of electric power in the sleep state is not limited to the example in the present embodiment.

Figure 5:
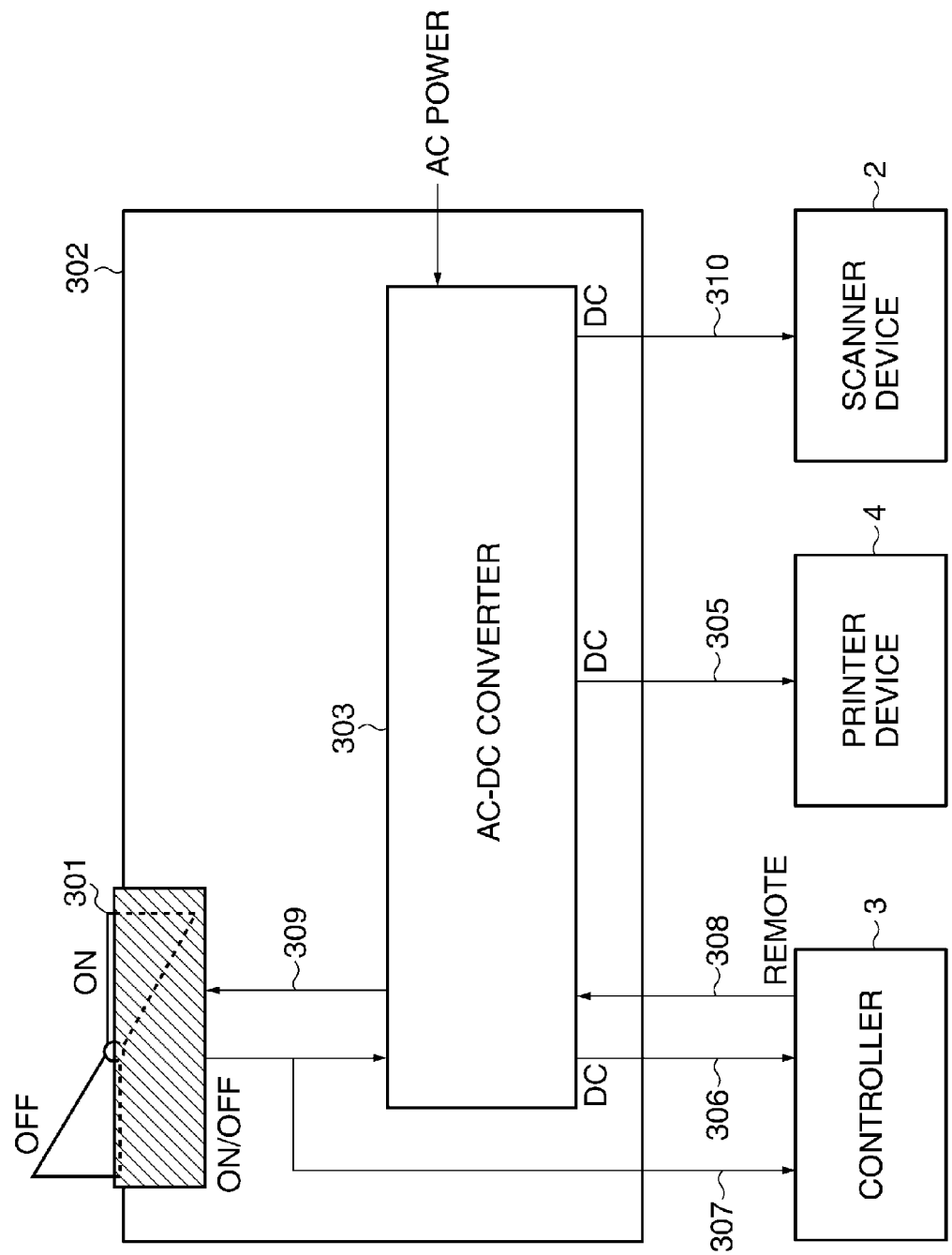
FIG. 5 is a diagram of a power supply unit of the image forming apparatus shown in FIG. 1.

FIG. 5 is a diagram of a power supply unit of the image forming apparatus 1 in FIG. 1.

As shown in FIG. 5, the power supply unit 302 supplied with power from AC power supply is provided with a seesaw switch 301 and an AC-DC converter 303.

The seesaw switch 301 is a toggle switch provided with a solenoid for pulling the switch to turn it off. The seesaw switch 301 mechanically holds one of the ON state and the OFF state. The operator operates the seesaw switch 301 by turning the same to one of the ON side and the OFF side. The operator can turn on or off the power of the image forming apparatus 1 by thus operating the seesaw switch 301.

A power cable 305 is used to supply DC power to the printer device 4. A power cable 306 is used to supply electric power to the controller 3. A line 307 is used to notify the interrupt controller 210 of the state of the seesaw switch 301.

A power remote signal line 308 is used to send a power remote signal output from a GPIO (general-purpose input and output) included in the CPU 201, for controlling output from the AC-DC converter 303. A power cable 309 is used to supply electric power to the seesaw switch 301. A power cable 310 is used to supply DC power to the scanner device 2.

Further, in executing processing for shutdown of the system, the controller 3 sends the power remote signal to the AC-DC converter 303 via the power remote signal line 308, thereby causing the AC-DC converter 303 to supply electric power to the seesaw switch 301 via the power cable 309.

Thereafter, the controller 3 drives the solenoid of the seesaw switch 301 to thereby turn off the seesaw switch 301. The seesaw switch 301 is connected to the AC-DC converter 303 and hence is capable of having the ON/OFF state thereof controlled.

The seesaw switch 301 is controlled by the controller 3 such that the supply of electric power via the power cable 306 is not stopped before completion of shutdown of the system. More specifically, the controller 3 is notified of the state of the seesaw switch 301 via the line 307, and the controller 3 stops the supply of DC power through the power cable 306 using the power remote signal line 308 after completion of the shutdown of the system. The above-described power supply configuration is the same as that of a general apparatus that requires shutdown.

In the present embodiment, the seesaw switch 301 having respective specific states, for selection, which are clearly indicative of ON and OFF states thereof is employed, but there are many personal computers and the like employing a power switch without the specific states for selection. The power switch mentioned here includes one which itself functions as a switch for shifting to the power saving state.

A switch without the specific states for selection have the following ON and OFF operational patterns: An operation to the switch acts, (1) when the power of an apparatus is on, to "turn off the system or give an instruction for shifting to the power saving state", whereas (2) when the power of the apparatus is off, to "turn on the system".

Further, the switch is configured to be forcedly turned off by being continuously pressed for a predetermined time period or longer.

The switch in the present embodiment is not limited to a toggle switch, such as the seesaw switch 301, but when a switch without the predetermined physical states is employed, it is possible to apply the ON and OFF operations of a toggle switch to the respective ON and OFF operational patterns (1) and (2).

Figure 6:
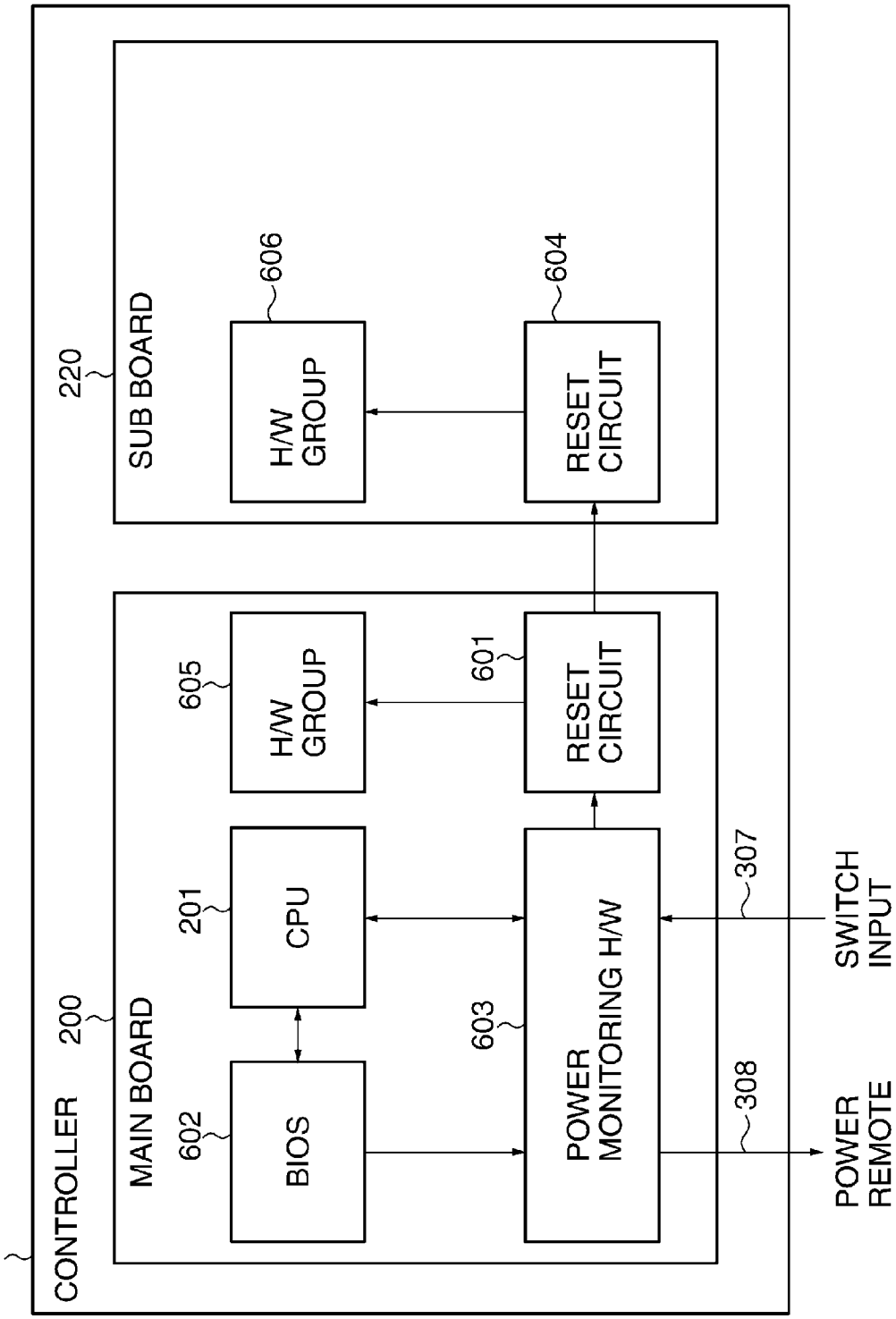
FIG. 6 is a diagram of the configuration of power supply monitoring hardware of the controller shown in FIG. 3.

FIG. 6 is a diagram of the configuration of power supply monitoring hardware of the controller 3 in FIG. 3.

As shown in FIG. 6, the main board 200 includes a reset circuit 601, power monitoring H/W 603, a BIOS 602, the CPU 201, and a H/W group 605. On the other hand, the sub board 220 includes a reset circuit 604 and a H/W group 606. The term H/W is an abbreviation for hardware, and the blocks described with reference to FIG. 3, but not shown in FIG. 6 are collectively depicted as H/W groups 605 and 606.

The BIOS 602 controls the basic components of hardware of the main board 200. The BIOS 602 includes low-level H/W control libraries. In general, the BIOS 602 is provided to ensure compatibility of an IBM compatible machine, and therefore, it is not essential to a so-called computer system. However, the BIOS 602 can execute part of the power saving function e.g. based on ACPI standard, and hence the description thereof is given here.

The power monitoring H/W 603 is a dedicated H/W logic for monitoring power control of the image forming apparatus 1. When an ASIC or the like is used, the power monitoring H/W 603 may be implemented e.g. by a small CPU system device.

A synchronous H/W chip has its internal state reset by a reset operation, and hence in a H/W circuit formed by synchronous H/W chips, it is required, when the apparatus is powered on, to reset each of the H/W chips by a reset circuit after electric power is supplied to the H/W chips.

Further, the H/W chips are in master-slave relationship, and hence a reset sequence is set, and the H/W chips are sequentially reset according to the reset sequence. For this reason, in general, one reset circuit is provided for each board, as in the present embodiment, such that a reset operation is performed for each of the boards by an associated one of the reset circuits.

The power monitoring H/W 603 receives a signal indicative of (is notified of) the state of the seesaw switch 301 via the line 307. The power monitoring H/W 603 is capable of controlling the supply of electric power in the main board 200 and the sub board 220, using the power remote signal line 308.

Further, when the CPU 201 is capable of normal operation, the power monitoring H/W 603 can reset the image forming apparatus 1 according to an instruction from the CPU 201.

On the other hand, when electric power is not being supplied to the CPU 201, the power monitoring H/W 603 can supply electric power to the controller 3 via the AC-DC converter 303, depending on the state of the seesaw switch 301.

With the power monitoring hardware configuration described above, the CPU 201 receives the signal indicative of (is notified of) the state of the seesaw switch 301 via the power monitoring H/W 603 e.g. when the seesaw switch 301 has been turned off.

More specifically, under normal conditions, the CPU 201 detects a power-off operation, and causes a shutdown sequence to operate to thereby give a shutdown instruction to the power monitoring H/W 603.

As a consequence, the AC-DC converter 303 is notified via the power remote signal line 308 that the power is to be turned off, and the supply of DC power supplied to the controller 3 via the power cable 306 is cut off. Thus, the image forming apparatus 1 is completely shut down.

This shutdown completely terminates programs executed by the CPU 201, so that when the seesaw switch 301 is turned on next time, the programs are executed by the CPU 201 as usual.

Now, a description will be given of the supply of electric power in a startup process. In a case where the image forming apparatus 1 is used, the user turns on the seesaw switch 301. The power monitoring H/W 603 detects via the line 307 that the seesaw switch 301 has been turned on, and then notifies the power supply unit 302 using the power remote signal line 308 of "power-on of the entire apparatus in response to switch-on".

The power supply unit 302 supplies electric power required at the power-on to the whole image forming apparatus 1. Specifically, the electric power is supplied to the controller 3, the printer device 4, and the scanner device 2. CPUs, not shown, provided in the printer device 4 and the scanner device 2, respectively, start an initialization in response to power-on.

Note that in the normal state, electric power is not necessarily supplied to all the H/W devices. For example, when printing is not performed, electric power may not be supplied to the printer device 4. Further, when the LCD touch panel 700 of the console section 5 is not displayed and it is known that a user is not in front of the image forming apparatus 1, no electric power is supplied to the scanner device 2.

A description will be given of the supply of electric power to the printer device 4, by taking an image printing function as an example. The CPU 201 stores image data received from the computer 9 via the LAN 8 in the memory 203. The CPU 201 analyzes the received image data, and generates a print job when the image printing function is to be executed.

The CPU 201 sends the power remote signal to the AC-DC converter 303 via the power remote signal line 308 to thereby cause electric power to be supplied to the printer device 4.

When the printer device 4 gets ready for printing, the CPU 201 executes a print job and transmits image data to the printer device 4 from the memory 203 via the bus controller 204, the bus controller 224, the CPU 221, the image processor 226, and the device controller 227.

The printer device 4 prints an image represented by the received image data, and notifies the CPU 201 of the result of the printing when the printing is completed.

When the printing is completed, the CPU 201 sends the power remote signal to the AC-DC converter 303 via the power remote signal line 308 to thereby cut off the supply of electric power to the printer device 4.

Figure 7:
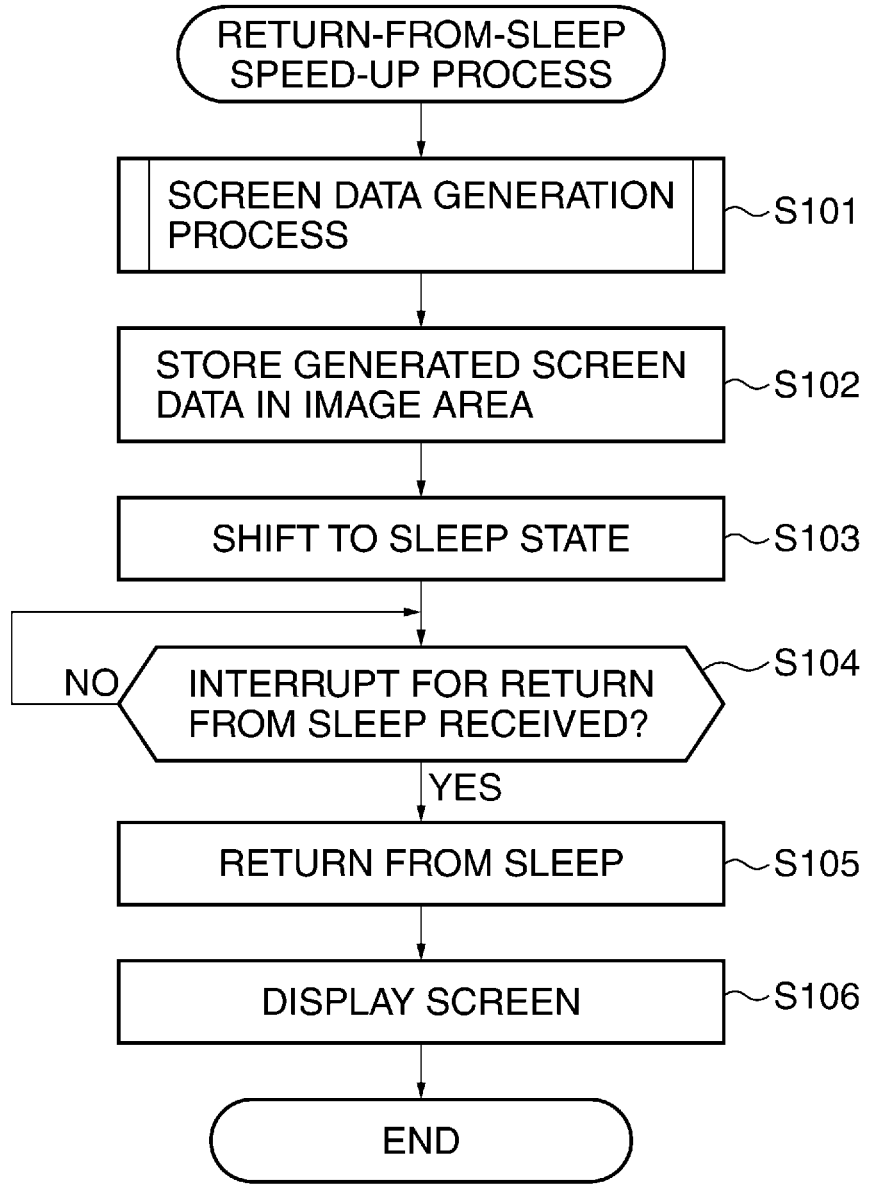
FIG. 7 is a flowchart of a return-from-sleep speed-up process executed by the controller shown in FIG. 3.

FIG. 7 is a flowchart of a return-from-sleep speed-up process executed by the controller 3 shown in FIG. 3.

The return-from-sleep speed-up process in FIG. 7 is executed when the soft power switch 709 or the power saving key 710 is operated or when a predetermined time period has elapsed without any user operation.

Before shift to the sleep state, the CPU 201 executes a screen data generation process for generating a screen to be displayed after return from sleep (step S101). The image data generated here will be described hereinafter with reference to a flowchart in FIG. 8. The step S101 corresponds to the function of a generation unit configured to generate, when the image forming apparatus 1 shifts from the normal state to the power saving state, image data to be displayed on the LCD touch panel 700 upon return of the image forming apparatus 1 from the power saving state to the normal state.

Then, the generated image data is stored in the image area of the memory 203 (step S102). This makes it possible to display a screen represented by the image data immediately after return from sleep. The step S102 corresponds to the function of a storage unit configured to store the image data generated in the step S101 in the memory 203. As shown in the step S102, the image data generated in the step S101 is stored in the memory 203 when the image forming apparatus 1 shifts from the normal state to the power saving state.

Then, the CPU 201 causes the image forming apparatus 1 to shift to the sleep state (step S103). At this time, the CPU 201 instructs the AC-DC converter 303 to supply electric power for shift to the sleep state by the power remote signal via the power remote signal line 308. More specifically, the CPU 201 causes the power monitoring H/W 603 to supply electric power to the memory 203, the interrupt controller 210, the soft power switch 709 of the console section 5, the network controller 211, the RTC 212, the FAX device 7, and the USB controller 208.

Then, when the interrupt controller 210 receives an interrupt for return from sleep (step S104), processing for return from sleep is started. The CPU 201 executes initialization processing, according to return from sleep, for each of the devices, as required. Further, the CPU 201 notifies software processes that the image forming apparatus 1 is to be returned from sleep to thereby execute return processing. Thus, the CPU 201 causes the image forming apparatus 1 to return from the sleep state (step S105).

The CPU 201 turns on the backlight of the LCD touch panel 700 to thereby cause the image to be displayed thereon (step S106), followed by terminating the present process. The step S106 corresponds to the function of a control unit configured to cause the LCD touch panel 700 to display the image represented by the image data stored in the memory 203 in the step S102.

Note that since image data to be displayed after return from sleep is stored in the image area before shift to the sleep state, the backlight may be turned on in earlier timing after reception of an interrupt in the step S104.

According to the process in FIG. 7, since image data is generated and stored in the image area before return from sleep, it is possible to dispense with time required for generating the image data and time required for storing the image data in the image area after return from sleep, which contributes to reduction of time taken before a screen is displayed after return from sleep. Further, it is possible to turn on the backlight in desired timing after return from sleep.

As describe above, according to the present embodiment, image data to be displayed on the display section after return of the image forming apparatus 1 from the power saving state to the normal state is generated when the image forming apparatus 1 shifts from the normal state to the power saving state. Then, the generated image data is stored in the memory 203, and the LCD touch panel 700 is caused to display an image represented by the image data stored in the memory 203 after the image forming apparatus 1 returns from the power saving state to the normal state. This makes it possible to reduce time taken before a screen is displayed after return from sleep.

Figure 8:
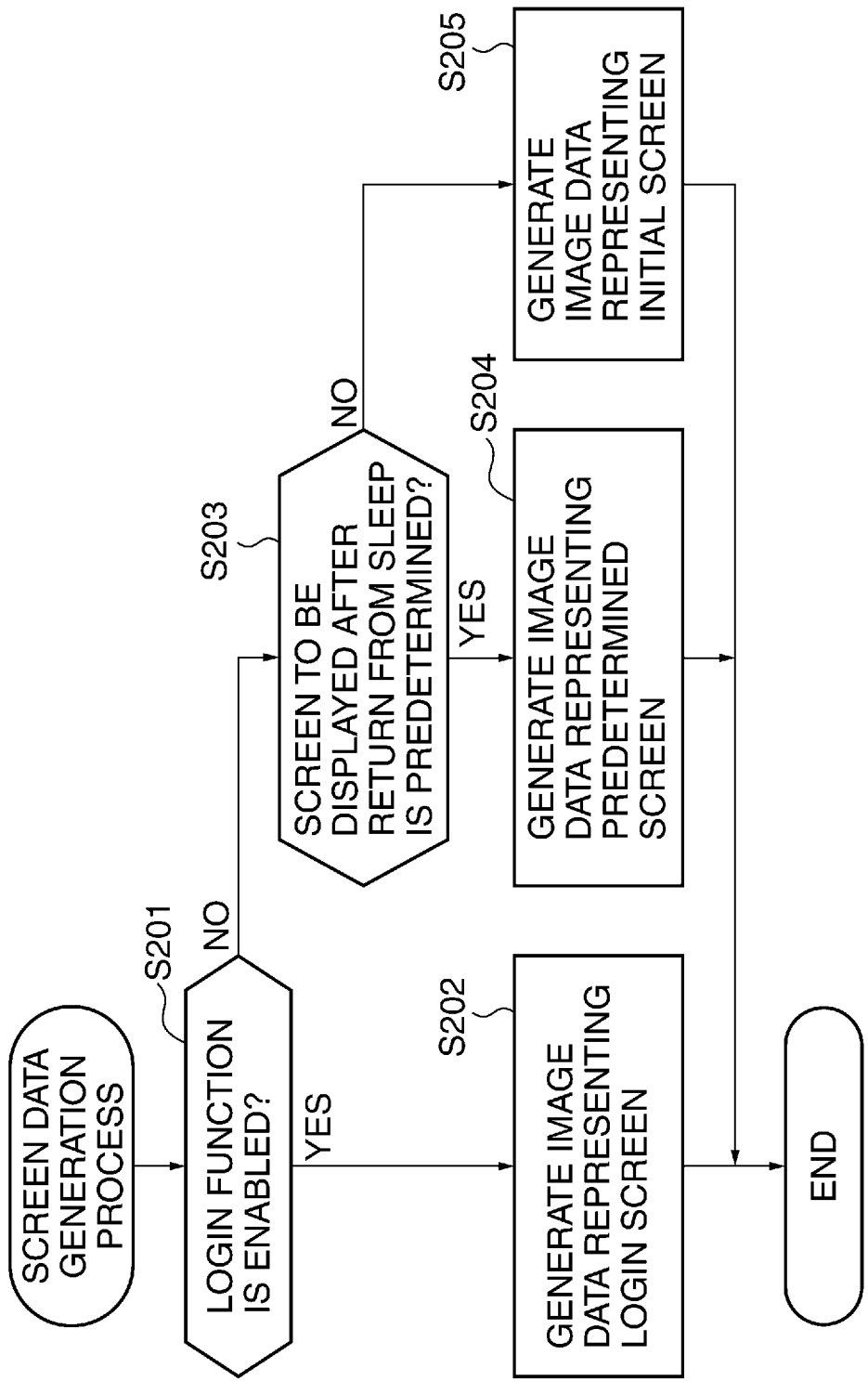
FIG. 8 is a flowchart of a screen data generation process executed in a step in FIG. 7.

FIG. 8 is a flowchart of the screen data generation process executed in the step S101 in FIG. 7.

Image data generated in FIG. 8 differs depending on settings of the image forming apparatus 1. In the present embodiment, a description is given, by way of example, of two settings as to whether or not a login function for using the image forming apparatus 1 is to be enabled and whether or not a screen to be displayed after return from sleep is predetermined.

First, it is determined whether or not the login function is enabled (step S201). If it is determined in the step S201 that the login function is enabled (YES to the step S201), image data representing a login screen is generated (step S202), followed by terminating the present embodiment.

On the other hand, if it is determined in the step S201 that the login function is not enabled (NO to the step S201), it is determined whether or not a screen to be displayed after return from sleep is predetermined (step S203).

If it is determined in the step S203 that a screen to be displayed after return from sleep is predetermined (YES to the step S203), image data representing the predetermined screen is generated (step S204), followed by terminating the present embodiment.

On the other hand, if it is determined in the step S203 that a screen to be displayed after return from sleep is not predetermined (NO to the step S203), image data representing an initial screen is generated (step S205), followed by terminating the present embodiment. A copy menu screen can be mentioned as an example of the initial screen.

Figure 9:
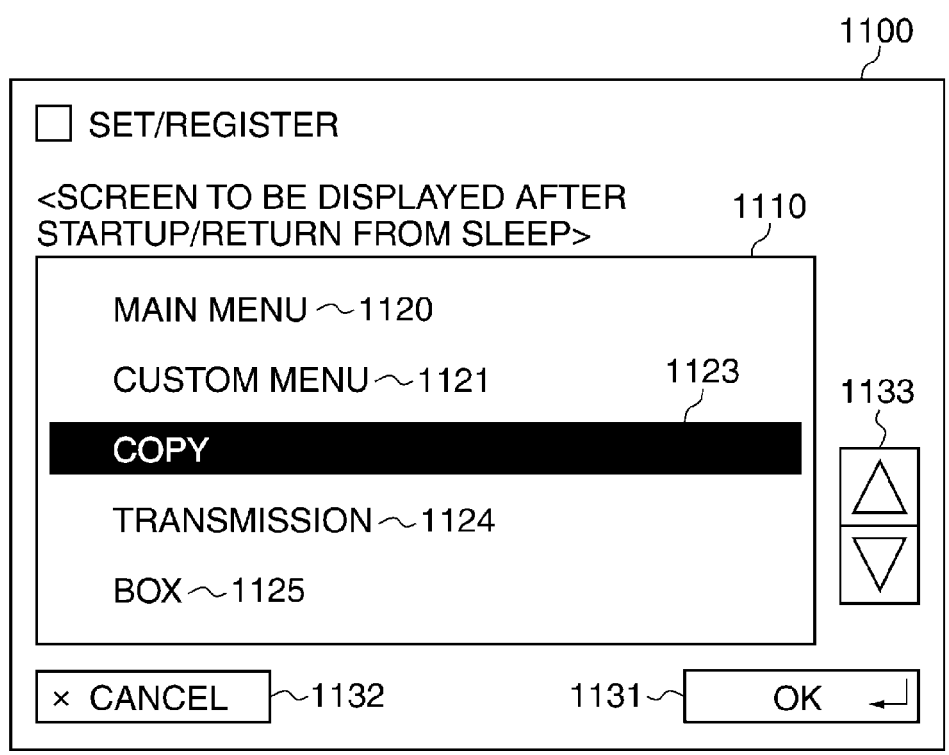
FIG. 9 is a view of a screen for setting a screen to be displayed on an LCD touch panel appearing in FIG. 2 when return from sleep is executed.

FIG. 9 is a view of a screen for setting a screen to be displayed on the LCD touch panel 700 appearing in FIG. 2 after return from sleep.

The screen 1100 shown in FIG. 9 is used to set a screen to be displayed not only after return from sleep but also at the start-up of the image forming apparatus 1.

A central field 1110 can be vertically scrolled using a scroll arrow button 1133 and by pressing an OK button 1131, a selected menu option in the central field 1110 can be set as the screen to be displayed after return from sleep. When a cancel button 1132 is pressed, the screen 1100 is closed without setting the screen to be displayed after return from sleep.

In the central field 1110, there are displayed menu options as items for selection, including main menu 1120, custom menu 1121, copy 1123, transmission 1124, and box 1125. Note that when the login function is enabled, even if any of these screens may be selected, a login screen is displayed.

Figure 10:
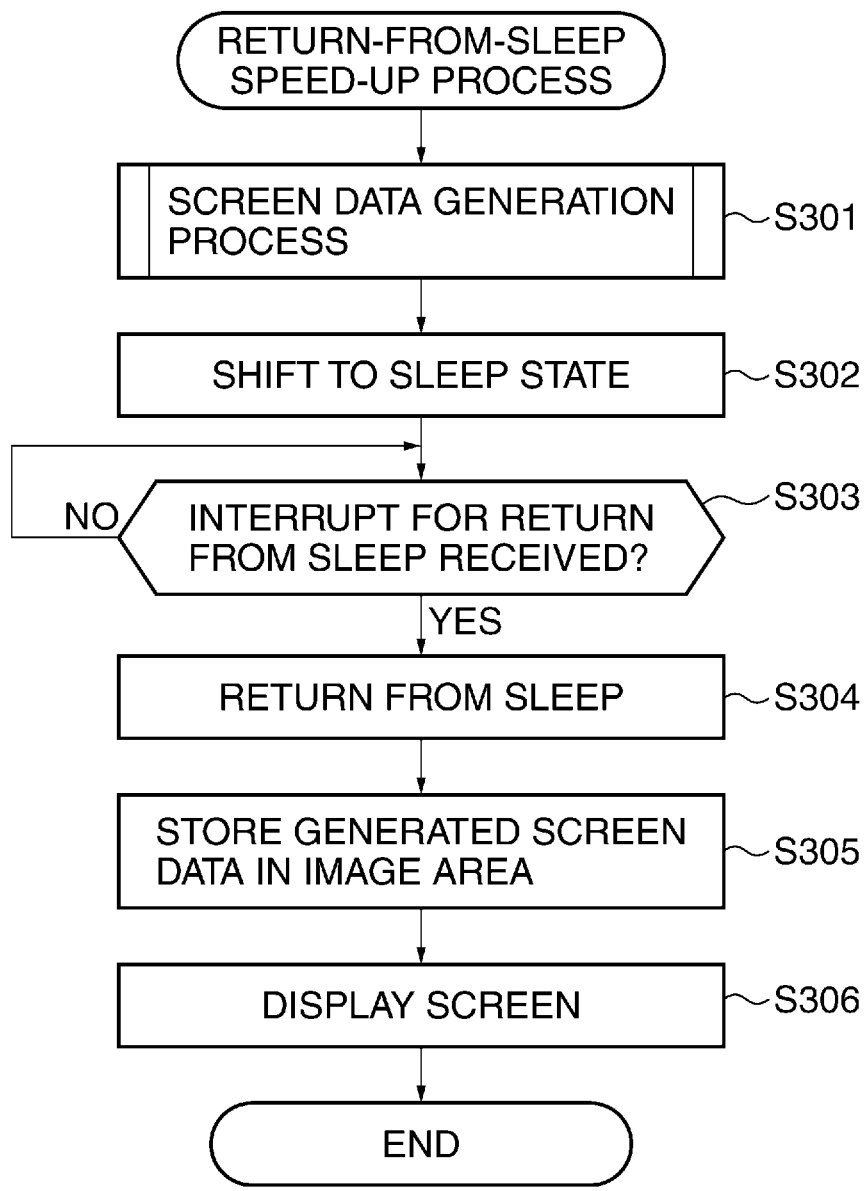
FIG. 10 is a flowchart of a variation of the return-from-sleep speed-up process executed by the controller shown in FIG. 3.

FIG. 10 is a flowchart of a variation of the return-from-sleep speed-up process executed by the controller 3 in FIG. 3.

Similarly to the process in FIG. 7, the return-from-sleep speed-up process in FIG. 10 is executed when the soft power switch 709 or the power saving key 710 is operated or when a predetermined time period has elapsed without any user operation.

Before shift to the sleep state, the CPU 201 executes the screen data generation process for generating a screen to be displayed after return from sleep (step S301). The image data generated here is the same as described with reference to FIG. 8.

Then, the CPU 201 causes the image forming apparatus 1 to shift to the sleep state (step S302). At this time, the CPU 201 instructs the AC-DC converter 303 to supply electric power for shift to the sleep state by the power remote signal via the power remote signal line 308. More specifically, the CPU 201 causes the power monitoring H/W 603 to supply electric power to the memory 203, the interrupt controller 210, the soft power switch 709 of the console section 5, the network controller 211, the RTC 212, the FAX device 7, and the USB controller 208.

Then, when the interrupt controller 210 receives the interrupt for return from sleep (step S303), the processing for return from sleep is started. The CPU 201 executes initialization processing, according to return from sleep, for each of the devices, as required. Further, the CPU 201 notifies software processes that the image forming apparatus 1 is to be returned from sleep to thereby execute return processing. Thus, the CPU 201 causes the image forming apparatus 1 to return from the sleep state (step S304).

Then, the CPU 201 stores the image data generated in the step S301 in the image area of the memory 203 (step S305). Further, as shown in the step S305, the image data generated in the step S301 is stored in the memory 203 when the image forming apparatus 1 returns from the power saving state to the normal state.

The CPU 201 turns on the backlight of the LCD touch panel 700 to thereby cause the image to be displayed on the same (step S306), followed by terminating the present process.

According to the process in FIG. 10, since image data is generated before return from sleep, it is possible to eliminate time required for generating the image data after return from sleep, which contributes to reduction of time taken before a screen is displayed after return from sleep. Further, it is possible to turn on the backlight in desired timing after return from sleep.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to the exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2012-131917 filed Jun. 11, 2012, which is hereby incorporated by reference herein in its entirety.

What is claimed is:

1. An image forming apparatus that is capable of operating in a power saving state and a normal state in which a larger amount of electric power is consumed than in the power saving state, comprising:
   a display unit configured to display an image using image data stored in a storage unit; and
   a control unit configured to generate image data to be displayed on the display unit when the image forming apparatus returns from the power saving state to the normal state and to store the generated image data in the storage unit, before the image forming apparatus shifts from the normal state to the power saving state;
   wherein the display unit is configured to, when the image forming apparatus returns from the power saving state to the normal state, display an image using the image data stored in the storage unit.

2. The image forming apparatus according to claim 1, wherein when the image forming apparatus shifts to the power saving state, a backlight of the display unit is turned off.

3. The image forming apparatus according to claim 1, wherein when the image forming apparatus is in the normal state, power is supplied to the control unit, while when in the power saving state, electric power is not supplied to the control unit.

4. The image forming apparatus according to claim 1, further comprising a switch to be operated by a user,
   wherein when the switch is operated by the user in the normal state, the image forming apparatus shifts from the normal state to the power saving state.

5. The image forming apparatus according to claim 1, further comprising a selection unit selecting a screen to be displayed by the display unit when the image forming apparatus returns from the power saving state to the normal state,
   wherein the control unit configured to generate image data corresponding to the screen selected by the selection unit when the image forming apparatus returns from the power saving state to the normal state and to store the generated image date in the storage unit, before the image forming apparatus shifts from the normal state to the power saving state, and
   the display unit configured to, when the image forming apparatus returns from the power saving state to the normal state, display the screen using the image data stored in the storage unit.

6. A method of controlling an image forming apparatus that is capable of operating in a power saving state and a normal state in which a larger amount of electric power is consumed than in the power saving state, comprising:
   displaying an image using image data stored in a storage unit;
   generating, when the image forming apparatus shifts from the normal state to the power saving state, image data to be displayed when the image forming apparatus returns from the power saving state to the normal state and storing the generated image data in the storage unit, before the image forming apparatus shifts from the normal state to the power saving state; and
   displaying, when the image forming apparatus returns from the power saving state to the normal state, an image using the image data stored in the storage unit.

7. A non-transitory computer-readable storage device storing a computer-executable program for causing a computer to execute a method of controlling an image forming apparatus that includes a display section for displaying an image represented by image data stored in a storage section, and is capable of operating in a power saving state and a normal state in which a larger amount of electric power is consumed than in the power saving state, wherein the method comprises:

displaying an image using image data stored in a storage unit;

generating, when the image forming apparatus shifts from the normal state to the power saving state, image data to be displayed when the image forming apparatus returns from the power saving state to the normal state and storing the generated image data in the storage unit, before the image forming apparatus shifts from the normal state to the power saving state; and displaying, when the image forming apparatus returns from the power saving state to the normal state, an image using the image data stored in the storage unit.

\* \* \* \* \*